US007548886B2

(12) United States Patent
Kirkland et al.

(10) Patent No.: US 7,548,886 B2
(45) Date of Patent: Jun. 16, 2009

(54) SYSTEM AND METHOD FOR EARLY DETECTION AND PREVENTION OF IDENTITY THEFT

(75) Inventors: Dustin C. Kirkland, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1276 days.

(21) Appl. No.: 10/460,430

(22) Filed: Jun. 12, 2003

(65) Prior Publication Data

US 2004/0254868 A1    Dec. 16, 2004

(51) Int. Cl.
G06Q 40/00 (2006.01)
(52) U.S. Cl. .................. 705/44; 705/41; 455/456.1; 455/457; 455/411; 455/517; 713/165; 340/426.19; 340/426.21
(58) Field of Classification Search ............ 705/35–45; 235/380, 382; 455/456.1–457
See application file for complete search history.

(56) References Cited

U.S. PATENT DOCUMENTS

| 5,878,337 | A  | * | 3/1999 | Joao et al. .............. 455/406 |
| 6,612,488 | B2 | * | 9/2003 | Suzuki ................... 235/380 |
| 6,913,194 | B2 | * | 7/2005 | Suzuki ................... 235/380 |
| 2002/0087460 | A1 |   | 7/2002 | Hornung ................. 705/38 |
| 2002/0133462 | A1 |   | 9/2002 | Shteyn ................... 705/44 |
| 2002/0174062 | A1 |   | 11/2002 | Sines et al. .............. 705/39 |
| 2003/0009426 | A1 |   | 1/2003 | Ruiz-Sanchez ........... 705/78 |
| 2003/0056172 | A1 | * | 3/2003 | Vukelic et al. ........... 715/512 |
| 2004/0122685 | A1 | * | 6/2004 | Bunce .................... 705/1 |

FOREIGN PATENT DOCUMENTS

WO    WO 02/075681    *    9/2002

OTHER PUBLICATIONS

Seaguard Electronics and AlarmNetwork Announce the Skyalert Early Warning and Alarm Central Station Automation and Event Specific Subscriber Contact and Security Notification System Business Editors & High-Tech Writers. Business Wire. New York: Nov. 2, 2000. p. 1.*

(Continued)

*Primary Examiner*—Hani Kazimi
*Assistant Examiner*—Abhishek Vyas
(74) *Attorney, Agent, or Firm*—Yee & Associates, P.C.; Justin M. Dillon

(57) ABSTRACT

A system and method for early detection of identity theft are provided. An authorized user establishes an identity with an organization's computing system and registers a mobile device and a notification device with the organization's computing system. When a use of the identity is attempted, a record associated with the identity is retrieved and a request is sent to the registered mobile device for location information. The current location of the mobile device is compared to the location of the source of the request for authorization. If the current location of the mobile device is not within an area of the source of the authentication request, information about the attempted use is compared with the registered notification criteria. If the conditions of the attempted use fall within the notification criteria, a notification message is sent to the notification device.

20 Claims, 8 Drawing Sheets

OTHER PUBLICATIONS

Alerting Technology Emerging As Effective Way To Provide Customer Service Item Processing Report. Potomac: Feb. 27, 2003. p. 1.*

IMBOT(TM) Launches Distinctive Alert Messaging Service for Credit Card Industry at CardTech/SecurTech PR Newswire. New York: May 14, 2001. p. 1.*

IBM Research Disclosure 449100, "Method for Detecting and Preventing Identity Theft", Sep. 2001, pp. 1557-1558.

* cited by examiner

Circle Bank Credit Card Services
Automatic Notification Request Registration Please notify me and obtain my authorization before any transaction meeting the following criteria, and in which my mobile device is not within a designated area of the place at which the transaction is taking place, is approved. If I do not provide authorization to complete the transaction within 2 minutes of transmission of the notification, the pending transaction is to be rejected.

610 — Dollar Amount Greater than: ☐ $50.00  ☒ $100.00  ☐ $250.00  ☐ $500.00
☐ Other, please specify dollar amount: _____

620 — Types of Purchases: (Send Notification if Transaction is for any of these types of goods/services)
☒ Electronics  ☐ Housewares  ☐ Apparel
☐ Food/Dining  ☐ On-Line Purchases  ☐ Services 630 — Approved Vendors (Do not send Notifications for Transaction with these Vendors)
- Bob's Stereo Mart
- _____
- _____
- _____

640 — If a similar transaction has been made within the last [10 ▼] days, please
☒ Do  ☐ Do not use notification before authorizing the transaction.

*FIG. 6*

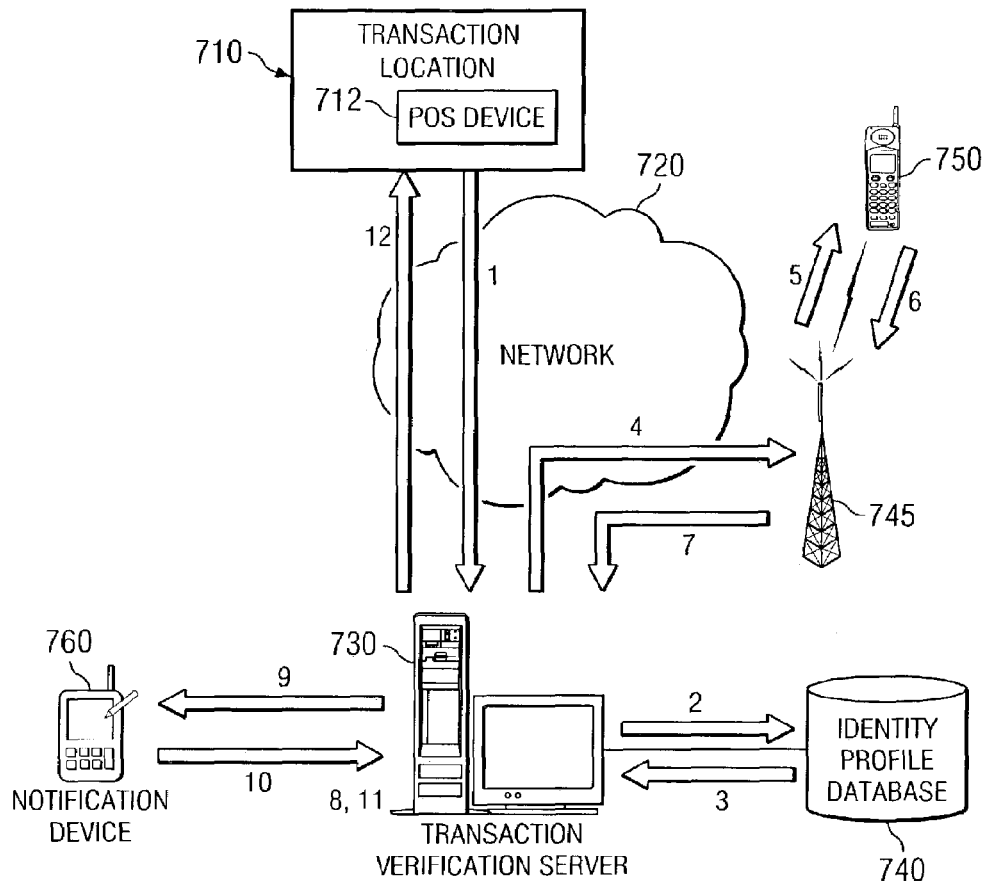

1. POS SENDS ACCOUNT INFORMATION, TRANSACTION INFORMATION, AND POSITION INFORMATION FOR TRANSACTION
2. TRANSACTION VERIFICATION SERVER SENDS REQUEST FOR IDENTITY ENTRY BASED ON ACCOUNT INFORMATION
3. TRANSACTION VERIFICATION SERVER RECEIVES IDENTITY ENTRY
4. TRANSACTION VERIFICATION SERVER SENDS REQUEST FOR CURRENT LOCATION INFORMATION TO REGISTERED MOBILE DEVICE TO BASE STATION
5. BASE STATION SENDS REQUEST FOR CURRENT LOCATION INFORMATION TO MOBILE DEVICE
6. MOBILE DEVICE RETURNS CURRENT LOCATION
7. BASE STATION FORWARDS CURRENT LOCATION TO TRANSACTION VERIFICATION SERVER
8. TRANSACTION VERIFICATION SERVER COMPARES CURRENT LOCATION OF MOBILE DEVICE TO POSITION INFORMATION FOR TRANSACTION TO DETERMINE IF NOTIFICATION MAY BE NECESSARY
9. TRANSACTION VERIFICATION SYSTEM COMPARES TRANSACTION INFORMATION TO NOTIFICATION CRITERIA TO DETERMINE IF NOTIFICATION IS NECESSARY
10. TRANSACTION VERIFICATION SERVER SENDS NOTIFICATION TO NOTIFICATION DEVICE
11. TRANSACTION VERIFICATION SERVER RECEIVES RESPONSE FROM NOTIFICATION DEVICE (OR TIMES OUT).
12. RESULT (APPROVAL OR DENIAL) SENT TO POS

*FIG. 7*

SYSTEM AND METHOD FOR EARLY DETECTION AND PREVENTION OF IDENTITY THEFT

BACKGROUND OF THE INVENTION

1. Technical Field

The present invention is directed to a system and method for early detection and prevention of identity theft. More specifically, the present invention is directed to authorizing use of a person's identity based on a correspondence between a registered mobile device and the location at which the identity is attempting to be used.

2. Description of Related Art

Identity theft is an increasing problem in the information age. Since information is readily accessible via computer networks, persons wishing to obtain certain benefits by using another person's identity can easily obtain the information they need to assume the person's identity, e.g., social security number, account numbers, addresses, telephone numbers, driver's license numbers, passwords, personal identification numbers (PINs), and the like.

This is especially a problem in the area of credit card services and lines of credit. For example, it is possible for persons to create new lines of credit with an existing identity to develop new sources of funding. Thus, measures have been taken to attempt to authenticate the users in order to avoid identity theft. These measures, however, have various problems that make them less than perfect solutions to the problem.

One approach to preventing identity theft is to encrypt a PIN on the credit or bank card issued to a user and inform only the authorized user of the PIN. This solution does not provide adequate security since it is only necessary for an identity thief to view the authorized user entering the PIN during normal use in order to obtain the PIN and then use it with a stolen or counterfeit card to obtain access to the authorized user's account.

Moreover, if an identity thief obtains necessary identity information of another person, the identity thief may apply for a credit or bank card using the other person's identity and be provided with his/her own account and PIN using the other person's identity. In this case, encrypting of the PIN provides little if any security.

Another approach to preventing identity theft is to have a picture of the authorized user printed on the credit or bank card. This picture is provided to the credit or bank card issuing company by the authorized user and is intended to allow a cashier, merchant, or the like, to authenticate the user by comparing the picture on the credit card to the user attempting to use the card. While this approach theoretically will minimize use of stolen credit and bank cards, in actuality many cashiers, merchants, and the like pay very little attention to the credit or bank card when performing a transaction and thus, the purpose of the incorporated picture is not achieved. Moreover, this still does not prevent an identity thief from using another person's identity to apply for his/her own credit or bank card having his/her own picture on it but with the name of the person whose identity has been stolen.

Other approaches include using biometric information, complex or lengthy password sequences, and the like. None of these other approaches provide an adequate protection against identity theft. The use of biometric information as a safeguard requires new or additional hardware that is typically expensive. Merchants are less likely to invest in expensive hardware to protect customers against identity theft when the merchant is not bearing the burden of the consequences of identity theft. The use of complex passwords is susceptible to theft in the same way as PINs and other passwords and simply make it less likely for an identity thief to "guess" the password. Moreover, the more complex the password, the less likely the authorized user is going to be able to remember the password.

Thus, there is a need for a system and method to detect and prevent identity theft at an early stage before an identity thief is able to make use of the stolen identity. Moreover, there is a need for a system and method that notifies the authorized user of the identity when a non-authorized user is attempting to make use of the identity.

SUMMARY OF THE INVENTION

The present invention provides a system and method for early detection of identity theft. With the system and method of the present invention, an authorized user establishes an identity with an organization's computing system and registers both a mobile device and a notification device with the organization's computing system. For example, the authorized user may register a mobile telephone as the mobile device by providing the telephone number for the mobile telephone, the current mobile services provider information, and the like.

The authorized user may also register a personal digital assistant (PDA), home computer, portable computer, or the like, as a notification device to which notifications are to be sent when a possible unauthorized use of the identity is attempted. Such registration of the notification device may take the form of providing the Internet Protocol (IP) address, or other address information, of the notification device, the service provider providing communication service to the notification device, and other information.

Both the mobile device information and the notification device information may be independently verified with the service providers in order to ensure that the information entered by the authorized user is correct. This helps to avoid an identity thief providing incorrect information so that his/her own mobile device and notification device are used instead of the authorized user's devices. Added protection against identity theft is provided since it is less likely that an identity thief will go to the extent to register a mobile device with a first service provider using a stolen identity, register a notification device with a second service provider using the same stolen identity, and then attempt to register the identity with the organization's computing system.

If either one of the mobile device or the notification device verification fails, the registration of the identity with the organization's computing system will fail. In this way, an identity thief cannot merely steal a user's mobile device and attempt to register the identity with the organization's computing system. Moreover, it is unlikely that an identity thief will steal both the authorized user's mobile device and notification device.

In addition to registering the mobile device and the notification device, the authorized user may input notification criteria for sending notifications to the notification device. This notification criteria identifies conditions of the use of the identity that warrant a notification being sent to the authorized user so that he/she can authorize the use of the identity. For example, with a credit card transaction, the amount of the transaction, the type of goods being bought, the merchant at which the goods are being purchased, and the like, may all be used as criteria for determining whether a notification should be sent to the notification device before authorizing the transaction.

Having registered the mobile device, the notification device, and notification criteria, the present invention makes use of location information to determine whether a possible unauthorized use of a registered identity is being attempted. That is, when a use of the identity is attempted, the use of the identity must be verified with the organization's computing system. For example, if a person attempts to use a registered credit card at a particular merchant, the merchant swipes the credit card which causes a transaction authorization process to be started. This transaction authorization process involves contacting the credit card company's computing system to obtain authorization to proceed with the transaction.

When a request for authorization of the use of the identity is received by the organization's computing system, the present invention retrieves a record associated with the identity and sends a request to the registered mobile device for location information. In addition, the location of the source of the request is identified based on information received in the authorization request. This information may include the actual location of the source of the request or an identity of the source of the request. If an identity of the source of the request is included, a database of sources may be consulted to determine the location of the identifies source of the request.

The mobile device may then return a current location of the mobile device. This may be determined, for example, using a global positioning system (GPS) transceiver associated with the mobile device, triangulation or other location methods using signals from base stations, or the like. The current location of the mobile device is then compared to the location of the source of the request for authorization. If the current location of the mobile device is not within a predetermined distance of the location of the source of the request for authorization, a determination is made that a possible unauthorized use of the identity is being attempted. Since the mobile device is most likely being carried by the authorized user, if the mobile device is not within the vicinity of the location of the attempted use of the identity, it can be deduced that the person attempting the use the identity is not the authorized user.

If the mobile device is not within a predetermined distance of the source of the request for authorization, then information about the attempted use is compared with the registered notification criteria to determine if a notification should be sent to the notification device requesting authorization of the attempted use. This check and subsequent notification allows an authorized user to "lend" the registered identity to another unauthorized user with the authorized user's permission.

If the conditions of the attempted use fall within one or more of the notification criteria, a notification message may be composed and sent to the notification device. The notification message allows an authorized user of the notification device to authorize use of the identity at the source location. This notification message may include a request that the user of the notification device authorize or deny the attempted use of the identity. If a response is not received within a predetermined period of time, the attempted use of the identity may be automatically denied.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an exemplary diagram of an automatic notification request registration graphical user interface which may be used to register notification criteria associated with an identity;

FIG. 7 is an exemplary diagram illustrating the interaction of devices in a system in which the present invention is implemented;

DETAILED DESCRIPTION OF THE PREFERRED EMBODIMENT

The present invention provides a system and method for early detection of identity theft. With the present invention, a user initially makes use of a distributed data processing system to register an identity with a verification server. This registered identity is then used along with one or more communication systems, which may include a data network, a wireless communication network, a wired communication network, and the like, to authorize uses of the registered identity. Thus, a brief description of a distributed data processing system in which features of the present invention may be implemented is provided hereafter with reference to FIGS. 1-3.

Figure 1:
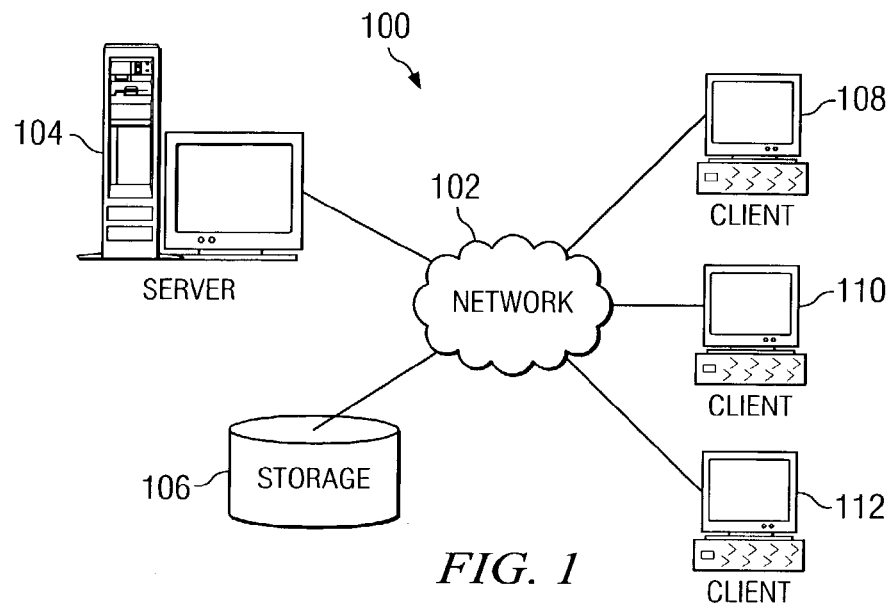
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
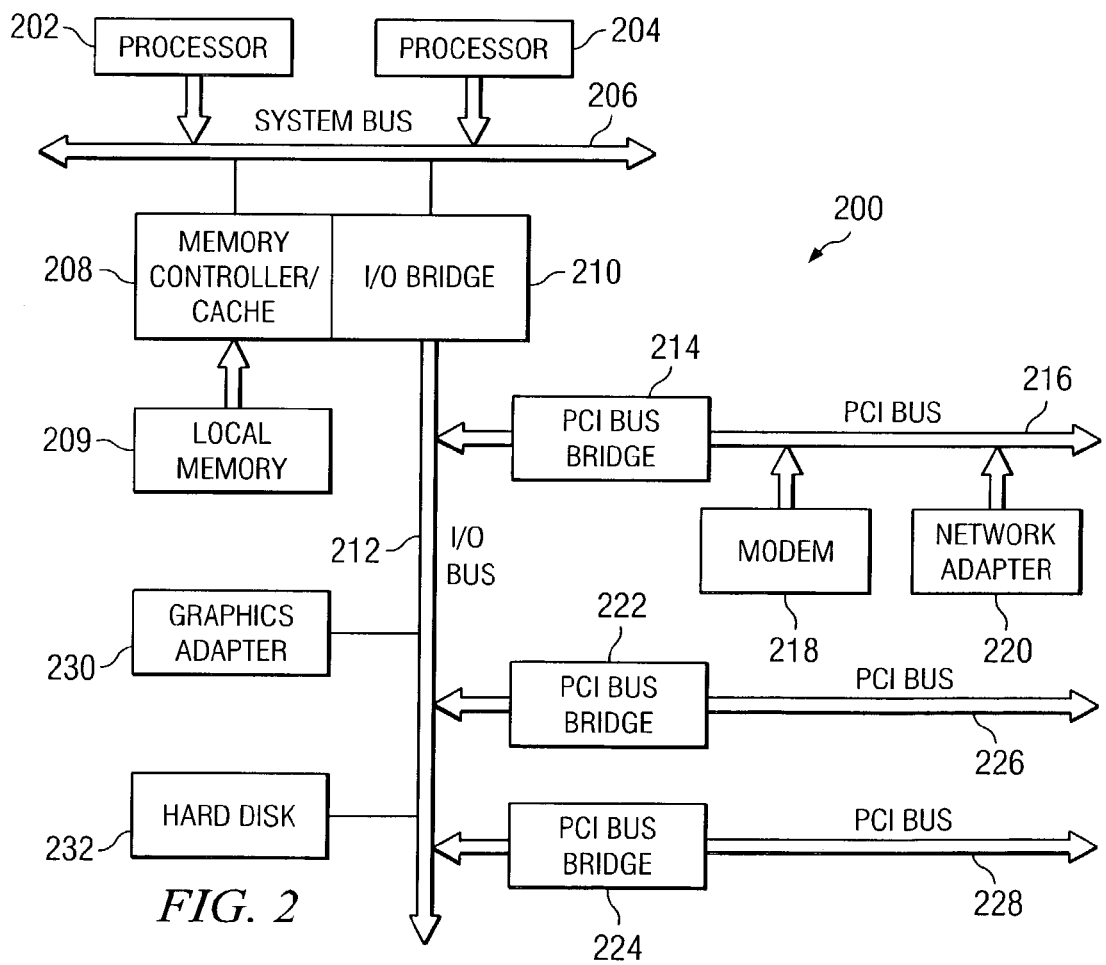
FIG. 2 is an exemplary diagram of a server computing device in which features of the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

Figure 3:
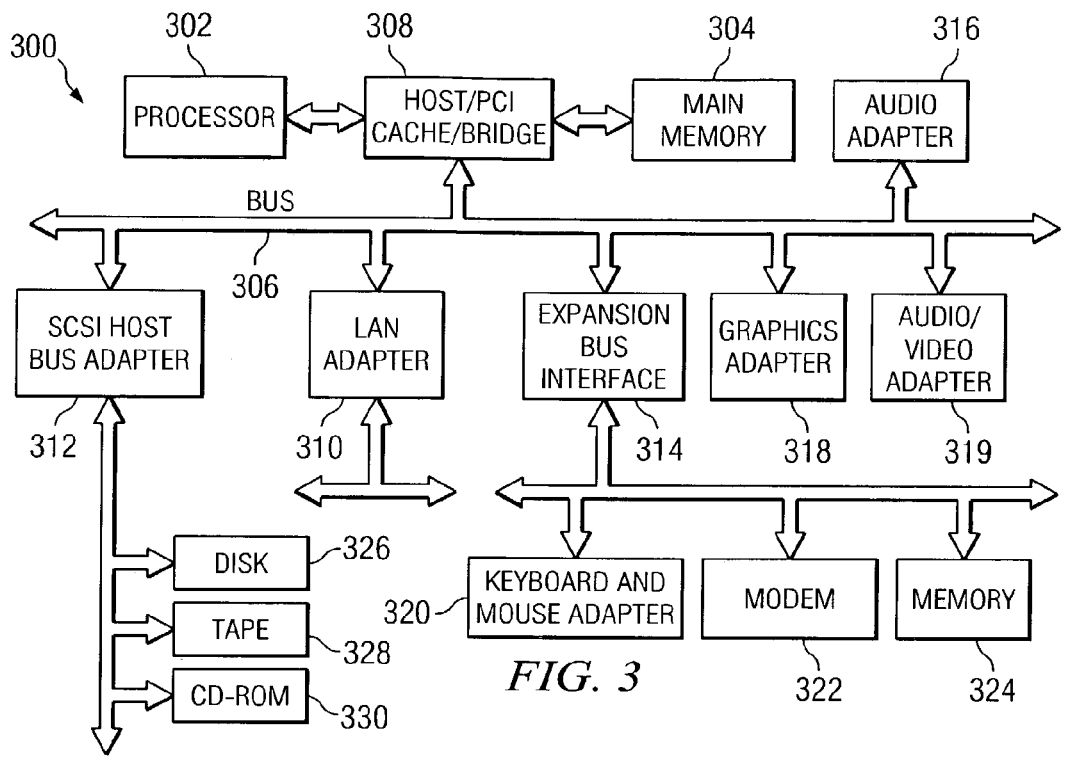
FIG. 3 is an exemplary diagram of a client device in which features of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned previously, the present invention provides a system and method for early detection of identity theft. With the system and method of the present invention, an authorized user establishes an identity with an organization's computing system, such as server 104 in FIG. 1, by logging onto the server 104 using a client device, such as client device 108, and submitting registration information. The registration information may be submitted, for example, using a graphical user interface provided in an applet, Web based form, a Web page, or the like. Other methods of supplying the registration information may be used without departing from the spirit and scope of the present invention. The information provided may include personal information about the authorized user, information about the particular identity being registered, and the like.

The term "identity" as it is used in the present disclosure is meant to refer to any information that is associated with, and is uniquely identified as being representative of, a single person authorized to make use of that information. Thus, in the context of the present invention, examples of "identity" include credit card account numbers, bank account numbers, social security card numbers, driver's license numbers, names and addresses, telephone numbers, other types of account numbers, membership identifications, and the like. For simplicity of the present description, the preferred embodiments will be described in terms of the "identity" being a credit card account number that may be provided, for example, on a credit card magnetic stripe or the like. However, it should be appreciated that the present invention may be applicable to various types of "identities" such as those listed above and others that are apparent to those of ordinary skill in the art.

Using the credit card account number as an example of the identity being registered in the preferred embodiments of the present invention, an authorized user may enter the user's name, address, telephone numbers, date of birth, mother's maiden name, and other identification information for the authorized user, along with the credit card account number, into a Web based form. This information may be verified to make sure that the information entered by the user corresponds to account information already established for the user by the credit card issuing company.

Moreover, the user may also enter mobile device information and notification device information for use by the present invention in sending a notification to the authorized user when an attempt is made to use the registered identity. The mobile device information may include, for example, a contact address of the mobile device and information about the service provider with which the mobile device is associated. For example, the user may enter a telephone number for a mobile telephone which the user intends to keep on his/her person and which can either provide its location information, such as by using an associated global positioning system (GPS), or have its location information determined, such as by a base station using triangulation or other mobile telephone location determining methodologies. In addition, the user may enter the name of the mobile telephone service provider that provides service to the mobile telephone. The user's personal information may then be verified with the mobile service provider's computing system to ensure that the mobile telephone number entered is a valid telephone number for the particular user identified in the personal information entered.

Similarly, the user may enter an address for the notification device and a name of a service provider of the notification device. In an example embodiment, the notification device is a personal digital assistant (PDA) having an address for use by an Internet proxy device. The address along with the Internet Protocol (IP) address of the proxy device may be used to uniquely identify the PDA on a data network. The service provider that provides the Internet proxy device and allows service to the PDA via the Internet proxy device may be identified in the information provided by the authorized user along with the IP address and/or the address the PDA uses with the Internet proxy device. The present invention may verify this notification device information and the personal information with the service provider to ensure that the information provided is valid.

Because both the mobile device information and the notification device information may be independently verified with their respective service providers, an identity thief may be prevented from providing incorrect information so that his/her own mobile device and notification device are used instead of the authorized user's devices. Added protection against identity theft is provided since it is less likely that an identity thief will go to the extent to register a mobile device with a first service provider using a stolen identity, register a notification device with a second service provider using the same stolen identity, and then attempt to register the identity with the organization's computing system. Furthermore, if an identity thief were to register the mobile device, notification device, and the identity, the identity thief would be providing a much longer paper trail than might otherwise be required to assume a person's identity. This would deter their actions as well as provide the authorities more information that may be used to catch such criminals.

If either one of the mobile device or the notification device verification fails, the registration of the authorized user with the verification system will fail. In this way, an identity thief cannot merely steal a user's mobile device and attempt to register the identity with the verification server. The identity thief must not only know the authorized user's identity and mobile device address, but must also know the authorized user's personal information, the mobile device service provider information, the notification device address and the notification device service provider information. Moreover, it is unlikely that an identity thief will steal both the authorized user's mobile device and notification device and be able to obtain access to all of this requisite information.

As mentioned previously, the mobile device information and notification device information are used to send notifications to an authorized user to obtain the authorized user's consent to the use of the identity. This notification is sent in response to a determination that the authorized user's registered mobile device is not within a predetermined range of the source of the request for authorization of the use of the identity.

That is, a range may be established as a radial distance from a source, e.g. a point of sale device or merchant computing system, of the request or a bounding polygon associated with the source of the request. With a radial distance, a circular area is established around the source where the mobile device must be present in order for the transaction to automatically be completed without a notification being sent to the authorized user's registered notification device. With a bounding polygon, a non-circular area is established around the source in which the mobile device must be present in order for the transaction to automatically be completed without a notification being sent to the authorized user's registered notification device. The bounding polygon approach may be utilized in situations in which the source of the request is in close proximity to other sources, such as in a shopping mall setting, and may be used to avoid the designated area overlapping more than one source.

Again using the credit card account number as an example, assume a person swipes the authorized user's credit card through a magnetic stripe reader at a merchant's location in order to make a purchase of some goods. In swiping the credit card, an authorization process commences that involves the sending of an authorization request including account information, transaction information, and location information to the verification server. The location information may be the actual latitude and longitude, map coordinates, or the like, of the point of sale device or merchant computing system, for example. Alternatively, the location information may be an identifier of the merchant which can be used to lookup an associated location of the merchant in a location database.

In response to receiving the authorization request, the verification server retrieves an entry in a registered account database that corresponds to the account information provided in the authorization request. The verification server then requests location information from the mobile device registered in the retrieved entry. The mobile device, or the base station with which the mobile device is currently registered, may then respond with the mobile device's location which may then be compared to the location of the source of the authorization request. If the two locations are more than a predetermined distance apart, or if the mobile device's location is not within a prescribed area of the merchant's location, it may be determined that a notification should be sent to the registered notification device associated with the entry in order to obtain authorization to approve of the use of the credit card to purchase the goods.

In one exemplary embodiment, a notification is sent to the authorized user's registered notification device every time an attempted use of the identity, e.g., the credit card account, is made at a location which is more than a predetermined distance, e.g., 150 feet, 0.25 miles, or the like, from the location of the registered mobile device, or if the mobile device is not within a prescribed area of the location at which the credit card account is being used. Thus, all that needs to be determined is that the difference between the location of the mobile device and the location of the merchant, or source of the authorization request, is greater than the predetermined threshold distance or that the mobile device is not within the prescribed area of the merchant. If the difference is greater than the predetermined threshold distance, or if the mobile device is not within the prescribed area of the merchant, a notification is automatically sent by the verification server.

In an alternative embodiment, the determination as to whether to send a notification may be based on notification criteria that are established by the authorized user. This notification criteria may be established during initial registration, at some later time, and may be modified by the authorized user after having been established. The notification criteria provide a mechanism by which the authorized user can limit the number of notifications that he/she receives. This may be beneficial, for example, in situations where the authorized user "lends" his identity, e.g., credit card account, to other persons, e.g., a wife, child, etc., with his/her consent while still providing a measure of security.

For example, in addition to registering the mobile device and the notification device as described previously, the authorized user may input notification criteria for sending notifications to the notification device. This notification criteria identifies conditions of the use of the identity that warrant a notification being sent to the authorized user so that he/she can authorize the use of the identity. The authorized user may establish an initial notification profile by registering this notification criteria and then modify this notification profile at a later time by logging onto the verification server and performing account management operations to change the notification criteria.

Returning to the credit card account example, the amount of the transaction, the type of goods being bought, the merchant at which the goods are being purchased, and the like, may all be used as criteria for determining whether a notification should be sent to the notification device before authorizing the transaction. For example, notification criteria may be set up such that any purchase of $100.00 or more, and in which the registered mobile device is more than a predetermined distance away from the merchant location, must be approved by the authorized user via a notification message prior to the purchase being completed. Similarly, transactions having to do with particular types of goods, such as high priced electronics, particular merchants, and the like, may all be susceptible to automatic notification to the authorized user prior to allowing the transaction to complete.

The above are examples of notification criteria indicating when a notification is to be sent to the authorized user prior to allowing the use of the identity, e.g., the credit card account. The notification criteria may also identify when notifications are not to be sent to the authorized user. That is, for example, when an authorized user makes frequent transactions with a particular merchant, or allows another person to use the authorized user's identity to make frequent transactions with a particular merchant, the authorized user may wish to establish notification criteria stating that transactions with that particular merchant need not generate a notification message prior to approval of the transaction.

Similarly, combinations of negotiation criteria may be used to determine whether to send a notification to the authorized user. For example, assume that an authorized user has established notification criteria indicating that transactions with Bob's Stereo Mart need not generate a notification message prior to approval of the transaction. Also assume that the authorized user has established notification criteria indicating that transactions involving $500.00 or more should generate a notification prior to approval. These two criteria may be used together such that a $150.00 transaction at Bob's Stereo Mart will not generate a notification but a $550.00 transaction at Bob's Stereo Mart will generate a notification. Such combinations of criteria may be established by assigning priorities to notification criteria, establishing an "or" or "and" type relationship between notification criteria, or the like.

Thus, with the present invention, when a request to approve the use of an identity is received by the verification server, the verification server checks the current location of the registered mobile device against the location of the source of the request. If the difference between these two locations is more than a threshold amount, a determination is made as to whether to send a notification message to the authorized user. This determination may involve comparing the transaction information received in the original request to notification criteria to determine if a notification should be sent. If a notification should be sent, the notification message is composed and transmitted to the notification device registered by the authorized user.

The notification message preferably includes an identifier of the amount of the transaction, the merchant or source of the transaction, and optionally the type of goods/services involved in the transaction. The notification message may further include user selectable options for either approving the transaction or rejecting the transaction.

If the approve option is selected, a response is sent back to the verification server indicating that the authorized user approves of the transaction and instructs the verification server to perform transaction processing in a normal manner. If the reject option is selected, a response is sent back to the verification server indicating that the authorized user does not approve of the transaction, and the verification server rejects the transaction in a normal manner. In addition, if a response is not received from the authorized user within a predetermined period of time from the time that the request for authorization was transmitted by the merchant or source, then the transaction will be rejected.

Thus, the present invention provides a system and method for determining if a person attempting to use a registered identity is the authorized user or not based on the location of the attempted use and the location of a registered mobile device associated with the authorized user. If it is determined that the locations are too far apart, then a notification is provided so that the authorized user is informed of the attempted use of the identity and is given an opportunity to approve of the use of the identity or reject the use of the identity.

Figure 4:
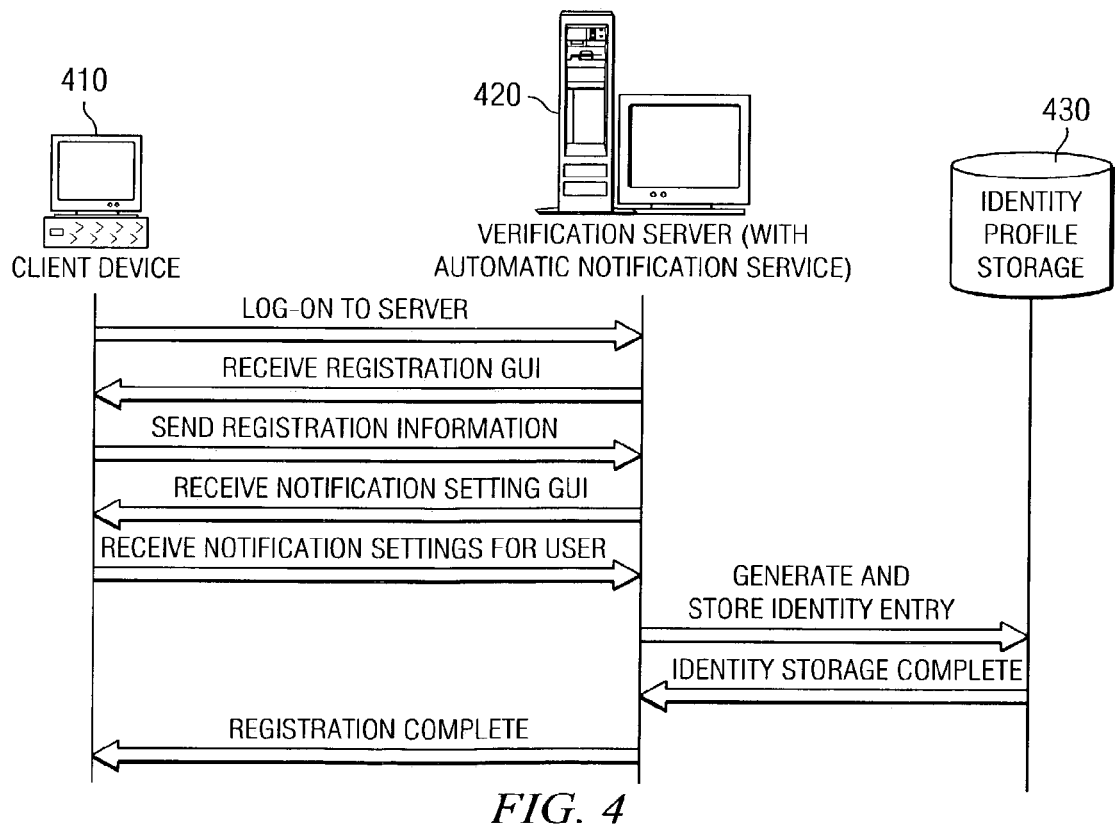
FIG. 4 is an exemplary message flow diagram illustrating a registration operation with a transaction authentication server.

FIG. 4 is an exemplary message flow diagram illustrating a registration operation with a transaction authentication server. As shown in FIG. 4, a client device 410 logs onto a verification server 420. For example, the client device 410 may be a user's home computer, a mobile computing device, or the like. The verification server 420 may be a server associated with an organization with which the user has an account, a membership, or the like, e.g., a credit card company server computing device.

In response to the log on of the client device 410, options may be provided to a user of the client device 410 for establishing an identity profile, updating an identity profile, or the like. In response to selection of establishing an identity profile, the verification server 420 may transmit a registration graphical user interface (GUI) to the client device 410. This GUI may be provided in an applet, a Web page, a Web form, or the like. In a preferred embodiment, the registration GUI includes fields in which the user of the client device 410 may enter personal information, mobile device information, and notification device information.

The user of the client device 410 enters the registration information into the appropriate fields of the registration GUI and transmits the entered information back to the verification server 420. In response to receiving the registration information, the verification server 420 may verify the entered information both with its own listing of valid accounts and users, and also with the mobile device and notification device service providers. Such verification may include sending a request for verification to the service providers via a data network and/or one or more communication networks.

Assuming that the verification of the user is completed successfully, the verification server 420 transmits a notification setting GUI to the client device 410. The notification setting GUI provides fields in which the user of the client device 410 may enter and/or select notification criteria that are of interest to the user. Once the user has completed entering and/or selecting the notification criteria that the user wishes to have associated with his/her identity profile, the notification settings are sent back to the verification server 420.

The verification server 420 receives the notification settings and generates an identity entry based on the registration information and the notification settings. This identity entry is then stored in the identity profile storage device 430. Once the identity profile is stored in the storage device 430, the storage device 430 returns a completion message to the verification server 420. The verification server 420 then transmits a registration complete message to the client device 410.

Figure 5:
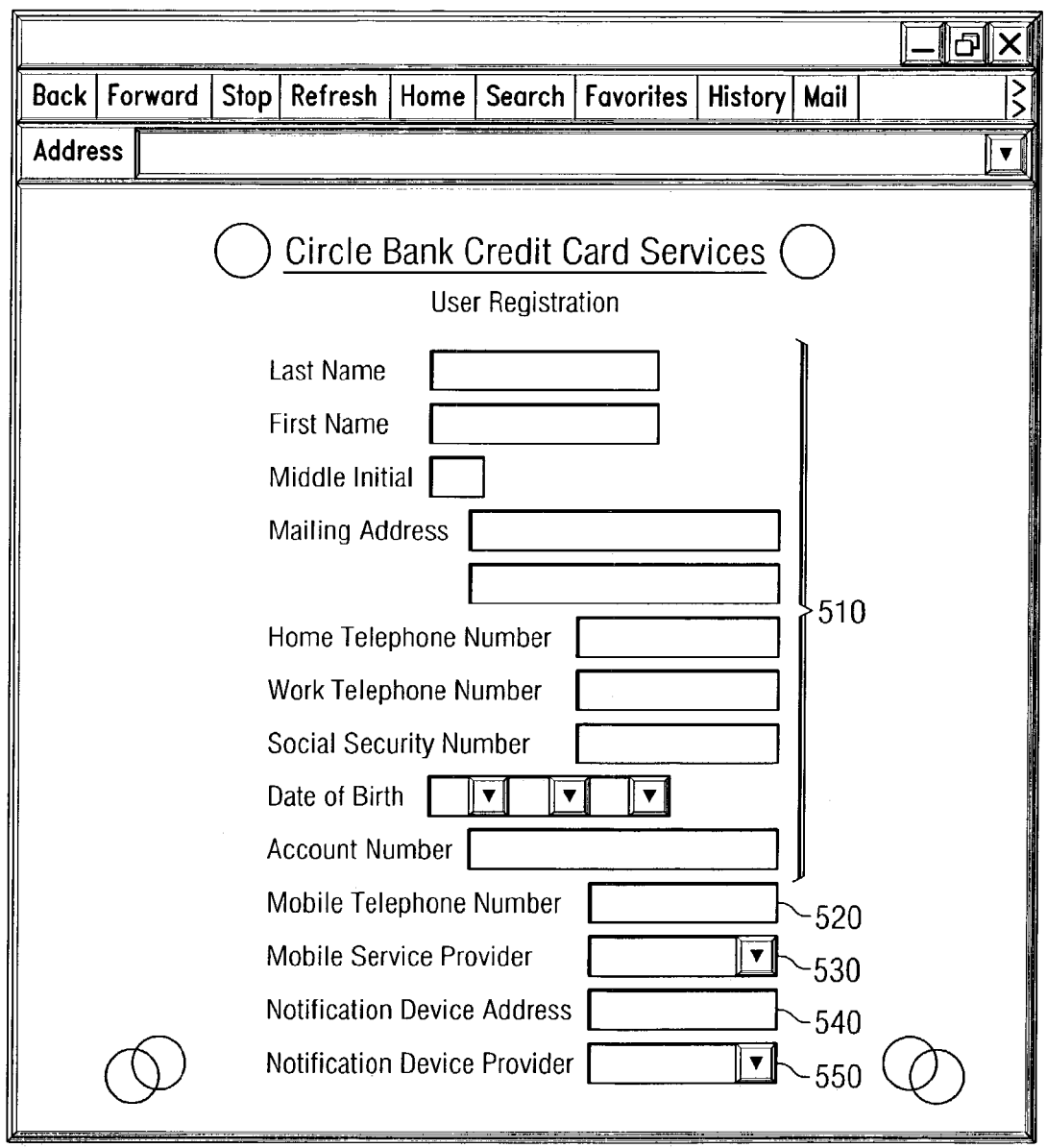
FIG. 5 is an exemplary diagram of a user registration graphical user interface which may be used to register a user and his/her mobile and notification devices with an exemplary credit card service.

FIG. 5 is an exemplary diagram of a user registration graphical user interface which may be used to register a user and his/her mobile and notification devices with an exemplary credit card service. As shown in FIG. 5, the graphical user interface provides fields 510 for entering personal information about the authorized user. This information may include, for example, the first name, last name and middle initial of the authorized user, the mailing address of the authorized user, telephone numbers, social security number, date of birth, and credit card account number. The information entered in these fields may be verified against information already stored in the credit card provider's computer records and also may be verified with the mobile and notification device service providers.

In addition, the graphical user interface may include fields 520-530 for entering a mobile telephone number and a mobile service provider identification. As shown, the selection of the mobile service provider may be performed from an established list of service providers, for example.

The graphical user interface may further include fields 540-550 for entering notification device address information and notification device service provider information. Again, the service provider information in field 550 may be selected from a predetermined list of known service providers, for example.

FIG. 6 is an exemplary diagram of an automatic notification request registration graphical user interface which may be used to register notification criteria associated with an identity. As shown in FIG. 6, the graphical user interface includes a plurality of check boxes 610 and 620 for identifying notification criteria associated with a dollar amount of a transaction and the types of goods/services involved in the transaction. For example, check boxes 610 provide the authorized user with the ability to designate a threshold dollar amount above which a notification will be sent to the authorized user prior to completing the transaction. Thus, if the authorized user selects the box next to the dollar amount "$100.00", then any subsequent transaction authorization request received from a merchant computing device, e.g., a point of sale device, in which it is determined that the registered mobile device is not within a designated range of the merchant computing device, and which is for a purchase price of $100.00 or greater, will result in a notification being sent to the authorized user's registered notification device.

The check boxes 620 allow the authorized user to select the types of goods/services that may be involved in a transaction for which the authorized user wishes to have a notification prior to completion of the transaction. That is, if the authorized user selects the box next to "electronics," then any transaction for the purchase of electronics in which the registered mobile device is not within a predetermined range of the merchant's computing system, or point of sale device, will result in a notification message being sent to the authorized user's registered notification device.

Fields 630 provide the authorized user with the option to enter or select vendors, i.e. merchants, for which notifications are not necessary. That is, if a transaction authorization request is received from a point of sale device or computing system of one of the vendors indicated in fields 630, these transactions are automatically approved (assuming that the authorized user has an available credit line to make the transaction).

Fields 640 are provided so that the authorized user may enter a condition for either notifying or not notifying the authorized user in the event that similar transactions occur within a selected time period of one another. That is, the authorized user may designate using fields 640 that if a similar transaction has been made within the last x days, a notification may or may not be sent to the authorized user's registered notification device prior to completing the transaction. The authorized user may select that a notification is sent if the authorized user typically does not make similar transactions within the designated period of time. The authorized user may select that a notification is not set if the authorized user typically does make similar transactions within the designated period of time.

With this option enabled, the present invention, when determining whether notification criteria are met, may compare the transaction information received in the transaction authorization request to records of transaction information for the designated period of time to determine if a similar transaction was previously made. For example, if the current transaction is for electronics and is being made with the vendor "Bob's Stereo Mart", then a check of the transaction records for the previous 10 days is made to determine if a previous transaction was made with Bob's Stereo Mart for electronics. If so, the authorized user may be provided with a notification requesting that they authorize the transaction to complete.

As previously mentioned the above notification criteria may be used exclusively with regard to one another or may be used in combination. When used in combination, priorities or combinatorial rules may be established for designating how to resolve potential conflicts in the notification criteria. As an example, the notification criteria may be combined such that any transaction involving less than $100.00 does not warrant a notification being sent except when the transaction is for electronics. However, if the transaction is less than $100.00, and is for electronics, but the transaction is with Bob's Stereo Mart, then a notification need not be sent. However, if the transaction is less than $100.00, is for electronics being bought at Bob's Stereo Mart, and a previous similar transaction is identified within 10 days of the current transaction, then a notification may be sent prior to authorizing the transaction to complete. Other similar complex combinations of notification criteria may be used without departing from the spirit and scope of the present invention.

FIG. 7 is an exemplary diagram illustrating the interaction of devices in a system in which the present invention is implemented. The example shown in FIG. 7 is directed to the use of a credit card account number as the "identity" of the authorized user. As previously mentioned, the present invention is not limited to any particular type of "identity" and other types of identities may be used without departing from the spirit and scope of the present invention.

As shown in FIG. 7, assume a person at a transaction location 710, such as a merchant location, is attempting to use a credit card to purchase an item. The person swipes their credit card through a magnetic stripe reader at the point of sale (POS) device 712. The POS device 712 then sends a transaction authorization request to the transaction verification server 730. The transaction authorization request includes credit card account information, transaction information, and location information. The account information may include, for example, the credit card number on the card and an expiration date. The transaction information may identify the type of goods/services being purchased (such as a general category of "electronics", "housewares", etc.), an amount of the pending sale, and the like. The location information may include actual coordinates for the POS device 712 or the transaction location 710, or may include only an identifier of the transaction location 710 or POS device 712 such that the actual coordinates may be retrieved from a location database associated with the transaction verification server 730 (not shown).

In response to receiving the transaction authentication request, the transaction verification server 730 retrieves an identity database 740 entry corresponding to the account information sent in the transaction verification request. The entry includes a registered mobile device address and a notification device address and may also include notification criteria.

The transaction verification server 730 then transmits a request for location information to the mobile device 750 via the base station 745. In response, either the mobile device 750 or the base station 745, depending on the type of mobile device location methodology used, returns the current location of the mobile device 750 to the transaction verification server 730.

The transaction verification server 730 then compares the current location of the mobile device 750 to the transaction location 710. A determination is made as to whether the mobile device's current location is within a prescribed area of the transaction location 710, e.g., within a radial distance or a bounding polygon of the transaction location 710. If so, the transaction is allowed to complete in a normal fashion. Otherwise, a determination is made as to whether to send a notification message to the authorized user's registered notification device.

The determination of whether to send a notification message to the authorized user's registered notification device may be dependent on the notification criteria established in the identity database 740 entry. Alternatively, a notification message may always be sent to the authorized user's registered notification device 760 when it is determined that the mobile device 750 is not within the prescribed area of the transaction location 710.

If notification criteria are used to determine whether to send a notification message to the notification device 760 or not, then a comparison of the transaction information received in the transaction authentication request to the notification criteria is made. If the comparison results in a determination that a notification is to be sent, the transaction verification server 730 generates the notification message and transmits it to the notification device 760. This notification may include, for example, the details of the pending transaction and a request for the user of the notification device 760 to either accept or reject the transaction.

In the depicted example, a response is received from the notification device 760 indicating either acceptance or rejection of the transaction. However, in some cases, a response may not be received and the transaction verification server 730 determines if a time-out condition occurs. If so, then the transaction is automatically rejected.

If either a response is received from the notification device 760 or a time-out condition occurs, a response from the transaction verification server 730 is sent to the POS device 712 indicating whether the transaction is approved or not. In order to approve the transaction, the mobile device 750 must be within the prescribed area of the transaction location 710 or a response from a notification device 760 indicating acceptance of the transaction must be received. In addition, normal verification of account balances and available credit must be made in order to determine that the credit card account has available credit for the pending purchase. Once the response is received by the POS device 712, the transaction is completed in a known fashion.

Figure 8:
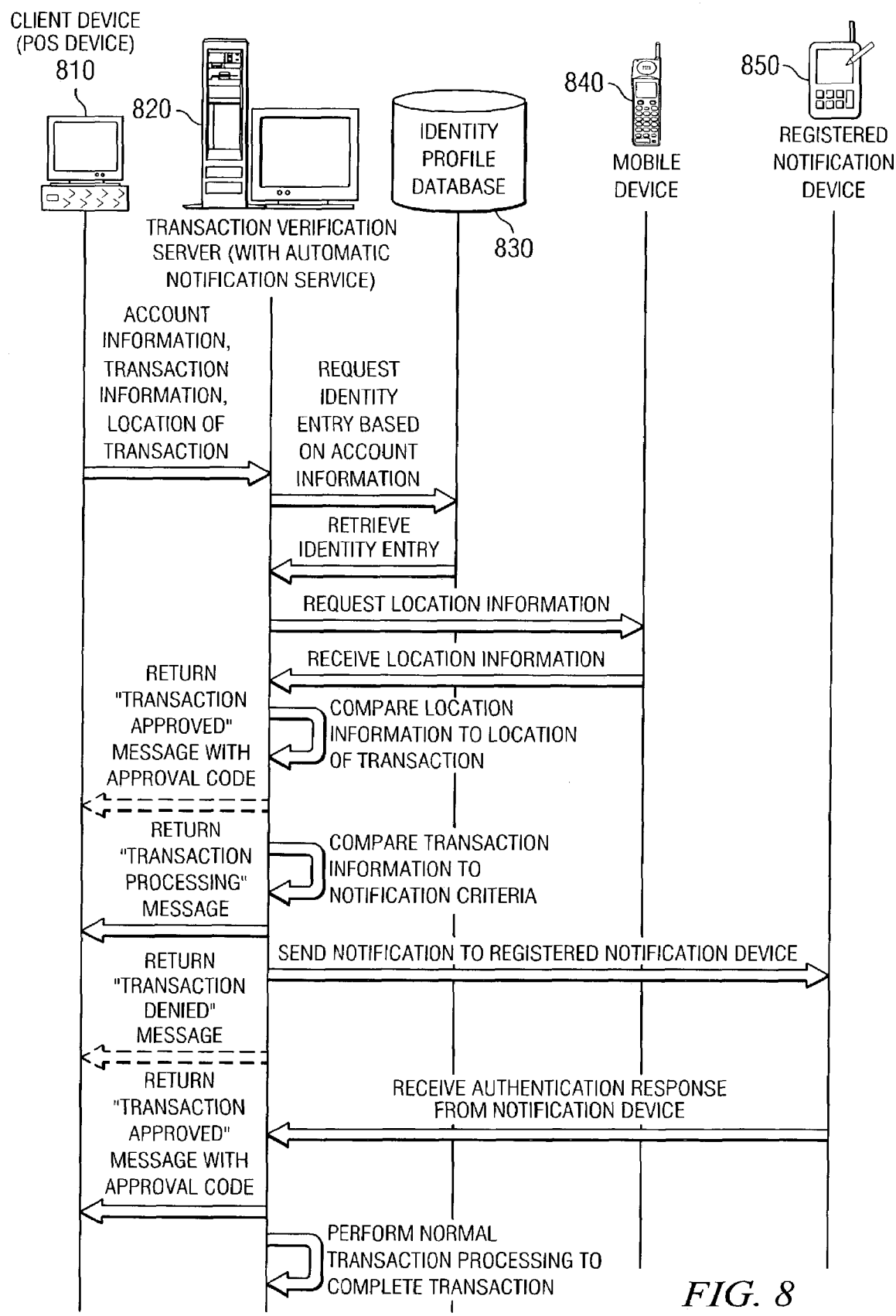
FIG. 8 is an exemplary message flow diagram illustrating the messages exchanged between devices in a system in which the present invention is implemented.

FIG. 8 is an exemplary message flow diagram illustrating the messages exchanged between devices in a system in which the present invention is implemented. As shown in FIG. 8, the client device 810, e.g., a POS device, sends a request for authorization of a transaction to the authentication server 820. The transaction verification server 820 retrieves an identity entry from the identity database 830 and sends a request for location information to the mobile device 840. The mobile device 840 responds with its current location and the transaction verification server 820 compares the location of the mobile device 840 with the location of the POS device 810.

If the mobile device 840 is within a prescribed area of the POS device 810, then a "transaction approved" message with an approval code is returned (assuming that other conditions of the transaction are met, e.g., available credit). If the mobile device 840 is not within the prescribed area of the POS device 810, then transaction information is compared to the notification criteria of the identity entry. A "transaction processing" message may be sent to the POS device 810 while the comparison is being performed and a notification is sent to the authorized user's registered notification device 850.

A determination is made based on the comparison of the transaction information to the notification criteria as to whether a notification should be sent or not. If a notification is not to be sent, the transaction is automatically approved (assuming other conditions of the transaction are met as above). If a notification is to be sent, the notification is generated and sent to the registered notification device 850.

A determination is then made as to whether a response is received from the notification device 850 within the required time period. If not, the transaction is denied and a "transaction denied" message is returned to the POS device 810. If a response is received, the transaction verification device 820 performs appropriate processing based on the response received. In the depicted example, the response is acceptance of the transaction and a "transaction approved" message with an approval code is returned to the POS device 810 (assuming other conditions of the transaction are met as above). The processing of the transaction is then continued in a known manner.

Figure 9:
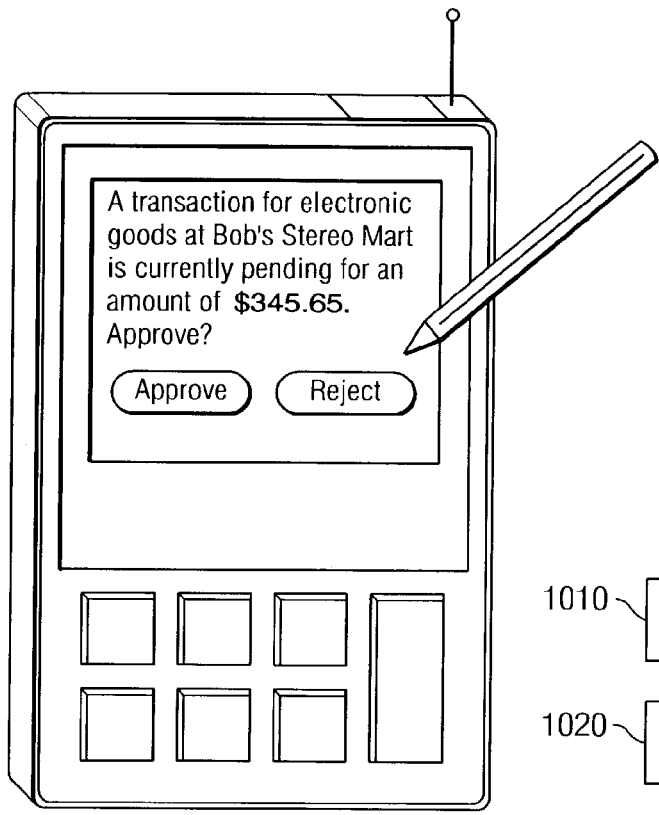
FIG. 9 is an exemplary diagram illustrating a notification message received and displayed by a notification device in accordance with an embodiment of the present invention.

FIG. 9 is an exemplary diagram illustrating a notification message received and displayed by a notification device in accordance with an embodiment of the present invention. The notification device shown in FIG. 9 is a personal digital assistant, however the present invention is not limited to such as discussed previously. As shown in FIG. 9, the notification message includes a text message identifying the source of the transaction authentication request, e.g., "Bob's Stereo Mart," the type of goods involved in the transaction, e.g., "electronic goods," and the amount of the transaction, e.g., "345.65." The notification message further includes graphical interface virtual buttons that may be selected by the user of the notification device, such as by using a stylus. Based on the selection of either the "approve" or "reject" virtual buttons, the notification device returns a response to the transaction verification device indicating whether the authorized user accepts or rejects the transaction indicated in the notification message.

Figure 10:
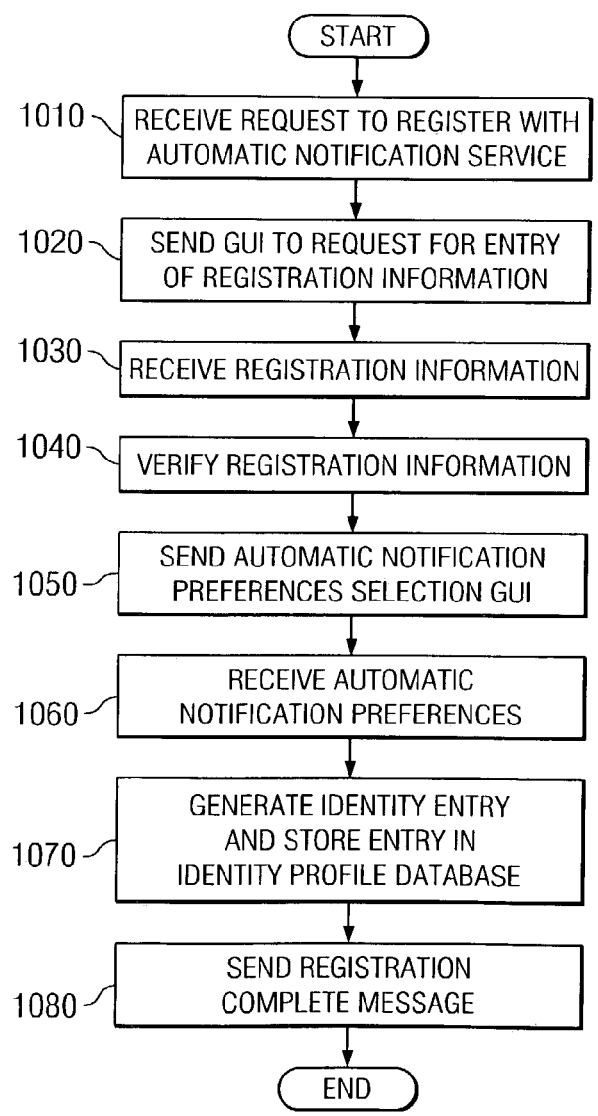
FIG. 10 is a flowchart outlining an exemplary operation of the present invention when registering an identity with a verification system.
Figure 11:
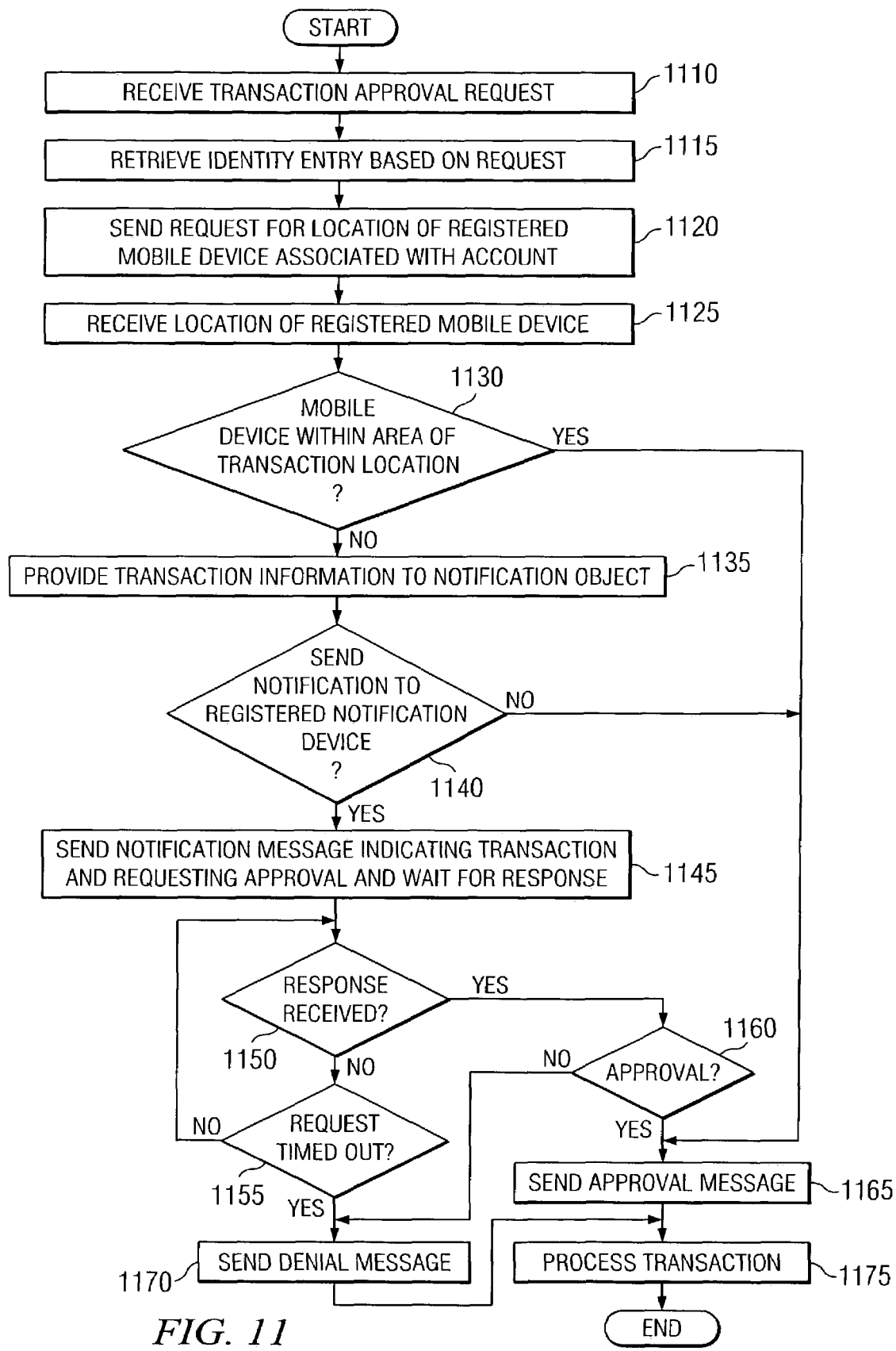
FIG. 11 is a flowchart outlining an exemplary operation of the present invention when authorizing an attempted use of an identity.

FIGS. 10 and 11 are flowcharts that illustrate a process for registering an identity and a process for verifying use of a registered identity, respectively, according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 10 is a flowchart outlining an exemplary operation of the present invention when registering an identity with a verification system. As shown in FIG. 10, the operation starts by receiving a request to register with an automatic notification service which may be part of a transaction verification server (step 1010). A graphical user interface or other type of information request is sent to the requestor so that the requester may enter registration information for registering with the automatic notification service of the transaction verification server (step 1020).

The registration information, which may include personal information, mobile device information, and notification device information, is then received (step 1030). The information returned by the requester is then verified (step 1040) and, assuming that the registration information is valid, an automatic notification preferences selection graphical user interface, or other mechanism for requesting information, is sent to the requestor (step 1050). The automatic notification preferences are then received in a response from the request (step 1060). The automatic notification preferences and the registration information are then used to generate an identity entry in an identity database (step 1070) and a registration complete message is returned to the requestor (step 1080).

FIG. 11 is a flowchart outlining an exemplary operation of the present invention when authorizing an attempted use of an identity. As shown in FIG. 11, the operation starts by receiving a transaction approval request (step 1110). An entry in the identity database is retrieved based on the information in the transactional approval request (step 1115). The mobile device associated with the entry is identified and a request for location information is sent to the mobile device (step 1120). The location information is received from the mobile device (step 1125) and a determination is made as to whether the mobile device is within an area of the transaction location (step 1130). This may be based on a comparison of the mobile device location with location information received in the transaction approval request or determined based on information in the transaction approval request.

If the mobile device is within the area of the transaction location, the transaction is approved (assuming other transaction requirements are met, e.g., available credit limit) (step 1165) and the transaction is processed in a normal fashion (step 1175). If the mobile device is not within an area of the transaction location (step 1130), then a comparison is made between the transaction information received in the transaction approval request and the notification criteria associated with the retrieved entry (step 1135).

A determination is made as to whether a notification is to be sent to the registered notification device (step 1140). If not, the transaction is approved and an approval message is sent (step 1165). The transaction is then processed in a normal manner (step 1175).

If a notification is to be sent, the notification message is generated and sent to the notification device (step 1145). A determination is then made as to whether a response is received from the notification device (step 1150). If not, a determination is made as to whether the request has timed-out (step 1155). If not, the operation returns to step 1150. If the request has timed out, a transaction denied message is sent (step 1170) and the transaction is processed in a normal fashion as a denied transaction (step 1175).

If a response is received from the notification device (step 1150), then a determination is made as to whether it is an approval of the transaction (step 1160). If not, then a transaction denial message is sent (step 1170) and the transaction is processed in a normal fashion as a denied transaction (step 1175). If the response is an approval of the transaction, then an approval message is sent (step 1165) and the transaction is processed in a normal fashion as an approved transaction (assuming other transaction requirements are met, e.g., available credit limit) (step 1175). The operation then terminates.

Thus, the present invention provides a system and method for detecting and preventing identity theft at an early stage when an identity thief first attempts to make use of a stolen identity. The present invention safeguards an authorized user's identity by providing notification of attempted uses of an identity when it is determined that the authorized user is not within the area of the attempted use. The determination as to whether the authorized user is within the area of the attempted use is based on the current location of a registered mobile device which the authorized user is presumed to have on his/her person. In addition, the authorized user may establish notification criteria for filtering whether a notification is to be provided or whether to automatically authorize uses of the identity so that the authorized user is not subjected to unwanted notifications.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of authenticating use of an identity, the computer implemented method comprising:

receiving a request to authenticate the use of the identity from an electronic device in a first location;

determining a current location of a mobile device associated with the identity, the current location of the mobile device being a second location;

comparing the first location to the second location; and determining whether to authorize the use of the identity based on results of comparing the first location to the second location; wherein determining whether to authorize the use of the identity based on results of comparing the first location to the second location comprises:

determining whether the first location is within a predetermined distance from the second location wherein the electronic device is a source and wherein determining whether the first location is within a predetermined distance from the second location further comprises:

responsive to a determination that the electronic device in the first location is not within a predetermined proximity to at least one other source, establishing a range as a radial distance from the electronic device in the first location to form a circular area around the electronic device, wherein the first location is within the predetermined distance from the second location if the mobile device is present within the circular area; and responsive to a determination that the electronic device in the first location is within a predetermined proximity to at least one other source, establishing a non-circular area around the electronic device in the first location to form a bounding polygon shaped area around the electronic device, wherein the first location is within the predetermined distance from the second location if the mobile device is present within the non-circular area;

responsive to a determination that the first location is within the predetermined distance from the second location, automatically authorizing the use of the identity without a notification being sent to a notification device;

responsive to a determination that the first location is more than the predetermined distance away from the second location, automatically determining whether to send a notification message to notification device, wherein automatically determining whether to send the notification message further comprises:

retrieving a notification profile associated with the identity, wherein the notification profile includes one or more notification criteria, wherein the notification criteria are used to determine whether to send a notification message to the notification device associated with the identity, wherein the one or more notification criteria limit a number of notifications that are sent to the notification device wherein the notification device is a different device than the mobile device;

comparing the one or more notification criteria to circumstances of the use of the identity; responsive to a determination that the circumstances of the use of the identity meet at least one of the one or more notification criteria, automatically sending the notification message to the notification device:

responsive to receiving a response from the notification device indicating that authorized user approves the use of the identity, transmitting an approval completion message to the electronic device at the first location, wherein the approval completion message indicates authorization for the use of the identity;

responsive to receiving a response from the notification device indicating that authorized user rejects the use of the identity, transmitting a rejection message to the electronic device at the first location, wherein the rejection message indicates denial of the use of the identity; and responsive to a failure to receive a response from the notification device indication that the authorized user approves or rejects the user of the identity within a predetermined time-out period of time, transmitting a rejection message indicting that the transaction is rejected.

2. The computer implemented method of claim 1, further comprising:
receiving personal information, mobile device information, and notification device information from a user to form an identity profile for the user.

3. The computer implemented method of claim 2, further comprising:
verifying information in the identity profile with at least one service provider associated with the notification device, with at least one service provider associated with the mobile device, and based on listings of valid accounts and users.

4. The computer implemented method of claim 1, further comprising:
responsive to receiving the request to authenticate the use of the identity from an electronic device, retrieving an identity profile, wherein the identity profile comprises a registered mobile device address, a notification device address, and the notification criteria.

5. The computer implemented method of claim 1, wherein the one or more notification criteria include at least one of an amount of a purchase for which the identity is being used, types of goods or services being purchased using the identity, identity of the vendor with which the identity is being used, and whether a similar transaction using the identity has occurred within a predetermined time period.

6. The computer implemented method of claim 1, wherein the notification message includes:
information about the particular use of the identity for which authorization is sought; and
a user interface through which the user of the notification device may authorize or deny the use of the identity.

7. The computer implemented method of claim 1, wherein the mobile device and the notification device are each separately one of a personal digital assistant, a mobile telephone, a portable computer, and a personal desktop computer.

8. The method of claim 1, wherein the identity is one of a credit card number, an account number, a social security card number, a driver's license number, a name and address, a telephone number, and a membership identifications.

9. The computer implemented method of claim 1, wherein the at least one of the one or more notification criteria is a dollar amount above which a notification will be sent, wherein the notification is sent to the notification device if the mobile device is not within the predetermined distance of the second location and a purchase price associated with the user of the identity is greater than the dollar amount.

10. A computer readable medium having computer instructions tangibly stored therein which when executed by a data processing system cause the system to perform the following steps:
receiving a request to authenticate the use of the identity from an electronic device in a first location;
determining a current location of a mobile device associated with the identity, the current location of the mobile device being a second location;
comparing the first location to the second location; and
determining whether to authorize the use of the identity based on results of comparing the first location to the second location, wherein the fourth instructions for determining whether to authorize the use of the identity based on results of comparing the first location to the second location comprises:
determining whether the first location is within a predetermined distance from the second location wherein the electronic device is a source and wherein the instructions for determining whether the first location is within a predetermined distance from the second location further comprises:
establishing a range as a radial distance from the electronic device in the first location to form a circular area around the electronic device in response to a determination that the electronic device in the first location is not within a predetermined proximity to at least one other source, wherein the first location is within the predetermined distance from the second location if the mobile device is present within the circular area; and
establishing a non-circular area around the electronic device in the first location to form a bounding polygon shaped area around the electronic device in response to a determination that the electronic device in the first location is within a predetermined proximity to at least one other source, wherein the first location is within the predetermined distance from the second location if the mobile device is present within the non-circular area;
automatically authorizing the use of the identity without a notification being sent to a notification device in response to a determination that the first location is within the predetermined distance from the second location;
automatically determining whether to send a notification message to a notification device in response to a determination that the first location is more than the predetermined distance away from the second location, wherein automatically determining whether to send the notification message further comprises:
retrieving a notification profile associated with the identity, wherein the notification profile includes one or more notification criteria, wherein the notification criteria are used to determine whether to send a notification message to the notification device associated with the identity, wherein the one or more notification criteria limit a number of notifications that are sent to the notification device, wherein the notification device is a different device than the mobile device;
comparing the one or more notification criteria to circumstances of the use of the identity;
automatically sending the notification message to the notification device associated with the identity in response to a determination that the circumstances of the use of the identity meet at least one of the one or more notification criteria;
transmitting an approval completion message to the electronic device at the first location in response to receiving a response from the notification device indicating that authorized user approves the use of the identity, wherein the approval completion message indicates authorization for the use of the identity;
transmitting a rejection message to the electronic device at the first location in response to receiving a response from the notification device indicating that the authorized user rejects the use of the identity, wherein the rejection message indicates denial of the use of the identity; and
transmitting the rejection message indicating that the transaction is rejected in response to a failure to receive a response from the notification device indicating that the authorized user approves or rejects the user of the identity within a predetermined time-out period of time.

11. The computer readable medium of claim 10, further comprising:
receiving personal information, mobile device information, and notification device information from a user to form an identity profile for the user.

12. The computer readable medium of claim 11, further comprising:
receiving personal information, mobile device information, and notification device information from a user to form an identity profile for the user.

13. The computer readable medium of claim 11, further comprising:
retrieving an identity profile, wherein the identity profile comprises a registered mobile device address, a notification device address, and the notification criteria in response to receiving the request to authenticate the use of the identity from an electronic device.

14. The computer readable medium of claim 10, wherein the one or more notification criteria include at least one of an amount of a purchase for which the identity is being used, types of goods or services being purchased using the identity, identity of the vendor with which the identity is being used, and whether a similar transaction using the identity has occurred within a predetermined time period.

15. The computer readable medium of claim 10, wherein the notification message comprises information about the particular use of the identity for which authorization is sought; and a user interface through which the user of the notification device may authorize or deny the use of the identity.

16. The computer readable medium of claim 10, wherein the identity is one of a credit card number, an account number, a social security card number, a drivers license number, a name and address, a telephone number, and a membership identification.

17. The computer readable medium of claim 10, wherein the at least one of the one or more notification criteria is a dollar amount above which a notification will be sent, wherein the notification is sent to the notification device if the mobile device is not within the predetermined distance of the second location and a purchase price associated with the user of the identity is greater than the dollar amount.

18. An apparatus for authenticating use of an identity, comprising:
means for receiving a request to authenticate the use of the identity from an electronic device in a first location;
means for determining a current location of a mobile device associated with the identity, the current location of the mobile device being a second location;
means for comparing the first location to the second location; and
means for determining whether to authorize the use of the identity based on results of comparing the first location to the second location; wherein the means for determining whether to authorize the use of the identity based on results of comparing the first location to the second location comprises:
means for determining whether the first location is within a predetermined distance from the second location wherein the electronic device is a source and wherein determining whether the first location is within a predetermined distance from the second location further comprises:
means for establishing a range as a radial distance from the electronic device in the first location to form a circular area around the electronic device in response to a determination that the electronic device in the first location is not within a predetermined proximity to at least one other source, wherein the first location is within the predetermined distance from the second location if the mobile device is present within the circular area; and
means for establishing a non-circular area around the electronic device in the first location to form a bounding polygon shaped area around the electronic device in response to a determination that the electronic device in the first location is within a predetermined proximity to at least one other source, wherein the first location is within the predetermined distance from the second location if the mobile device is present within the non-circular area;
means for automatically authorizing the use of the identity without a notification being sent to a notification device in response to a determination that the first location is within the predetermined distance from the second location; and
means for automatically determining whether to send a notification message to a notification device in response to a determination that the first location is more than the predetermined distance away from the second location, wherein automatically determining whether to send the notification message further comprises:
means for retrieving a notification profile associated with the identity, wherein the notification profile includes one or more notification criteria, wherein the notification criteria are used to determine whether to send a notification message to a notification device associated with the identity, wherein the one or more notification criteria limit a number of notifications that are sent to the notification device, wherein the notification device is a different device than the mobile device;
means for comparing the one or more notification criteria to circumstances of the use of the identity; and
means for automatically sending the notification message to the notification device associated with the identity in response to a determination that the circumstances of the use of the identity meet at least one of the one or more notification criteria; and
means for transmitting an approval completion message to the electronic device at the first location in response to receiving a response from the notification device indicating that authorized user approves the use of the identity; transmitting a rejection message to the electronic device at the first location in response to receiving a response from the notification device indicating that authorized user rejects the use of the identity, wherein the rejection message indicates denial of the use of the identity; and transmitting a rejection message indicting that the transaction is rejected in response to a failure to receive a response from the notification device indication that the authorized user approves or rejects the user of the identity within a predetermined time-out period of time, wherein the approval completion message indicates authorization for the use of the identity.

19. The computer implemented method of claim 1 further comprising:
registering the mobile device and the notification device associated with the identity to form mobile device information and notification device information;
independently verifying the mobile device information and the notification device information with a service provider of the mobile device and a service provider of the notification device;
responsive to a failure of a verification of either the mobile device information or the notification device information, failing a registration of the identity; and
responsive to a success of the verification of both the mobile device information and the notification device information, receiving the one or more notification criteria from a user associated with the identity.

20. The computer readable medium of claim 10 farther comprising:

registering the mobile device and the notification device associated with the identity to form mobile device information and notification device information;

independently verifying the mobile device information and the notification device information with a service provider of the mobile device and a service provider of the notification device;

failing a registration of the identity in response to a failure of a verification of either the mobile device information or the notification device information; and receiving the one or more notification criteria from a user associated with the identity in response to a success of the verification of both the mobile device information and the notification device information.

* * * * *